United States Patent
Akasaka (10) Patent No.: US 7,623,798 B1
(45) Date of Patent: Nov. 24, 2009

(54) POLARIZATION MODE DISPERSION MITIGATION OF MULTIPLE OPTICAL COMMUNICATION CHANNELS

(75) Inventor: Youichi Akasaka, Foster City, CA (US)

(73) Assignee: Sprint Communications Company L.P., Overland Park, KS (US)

( * ) Notice: Subject to any disclaimer, the term of this patent is extended or adjusted under 35 U.S.C. 154(b) by 444 days.

(21) Appl. No.: 11/243,107

(22) Filed: Oct. 4, 2005

(51) Int. Cl.
 *H04B 10/04* (2006.01)

(52) U.S. Cl. ............... 398/209; 398/161; 398/191; 398/201

(58) Field of Classification Search ........... 398/65, 398/68, 79, 147, 152, 158, 159, 161, 192, 398/195, 198, 98, 102, 201, 191; 359/615
See application file for complete search history.

(56) References Cited

U.S. PATENT DOCUMENTS

| | | | | |
|---|---|---|---|---|
| 5,594,583 A * | 1/1997 | Devaux | ............... | 398/181 |
| 5,801,862 A * | 9/1998 | Desurvire et al. | ............... | 398/80 |
| 5,959,764 A * | 9/1999 | Edagawa et al. | ............... | 359/326 |
| 6,172,781 B1 * | 1/2001 | Doerr | ............... | 398/9 |
| 6,604,871 B2 * | 8/2003 | Cao | ............... | 398/158 |
| 6,619,867 B1 * | 9/2003 | Asahi | ............... | 398/154 |
| 6,763,197 B1 * | 7/2004 | Hirano et al. | ............... | 398/192 |
| 6,785,002 B2 * | 8/2004 | Zarrabian et al. | ............... | 356/454 |
| 6,798,558 B2 * | 9/2004 | Hayashi et al. | ............... | 359/279 |
| 6,999,640 B1 * | 2/2006 | Harris | ............... | 385/11 |
| 7,076,169 B2 * | 7/2006 | Shpantzer et al. | ............... | 398/76 |
| 7,082,268 B2 * | 7/2006 | Schemmann et al. | ............... | 398/158 |
| 7,312,909 B2 * | 12/2007 | Glingener et al. | ............... | 398/192 |
| 7,336,906 B2 * | 2/2008 | Nesset et al. | ............... | 398/195 |
| 2002/0097464 A1 * | 7/2002 | Devaux et al. | ............... | 359/124 |
| 2002/0126346 A1 * | 9/2002 | Suzuki et al. | ............... | 359/123 |
| 2003/0058504 A1 * | 3/2003 | Cho et al. | ............... | 359/161 |
| 2005/0175348 A1 * | 8/2005 | Neddam et al. | ............... | 398/102 |

FOREIGN PATENT DOCUMENTS

FR 2706710 A1 * 12/1994

OTHER PUBLICATIONS

Harry J. R. Dutton, "Understanding Optical Communications", International Technical Support Organization, Copyright International Business Machines Corporation 1998.*
Yan, L.-S. et al. "Enhanced Robustness of RZ WDM Systems Using Tunable Pulse-Width Management at the Transmitter". 28th European Conference on Optical Communication, 2002. ECOC 2002. Sep. 8-12, 2002, vol. 4: 1-2.*

* cited by examiner

*Primary Examiner*—Leslie Pascal (57) ABSTRACT

An optical transmitter for an optical communication system is provided. Included in the transmitter is a first optical delay element configured to generate a second optical signal from a first optical signal. A second optical delay element is configured to generate a fourth optical signal from a second optical signal. An optical multiplexer is configured to combine the third and fourth optical signals to produce a fifth optical signal. Also included is an optical modulator configured to alter a pulse width of the fifth optical signal to generate a sixth optical signal. An optical delay controller is configured to control the first optical delay element and the second optical delay element based on the sixth optical signal.

17 Claims, 7 Drawing Sheets

POLARIZATION MODE DISPERSION MITIGATION OF MULTIPLE OPTICAL COMMUNICATION CHANNELS

RELATED APPLICATIONS

Not applicable.

FEDERALLY SPONSORED RESEARCH OR DEVELOPMENT

Not applicable.

MICROFICHE APPENDIX

Not applicable.

BACKGROUND OF THE INVENTION

1. Field of the Invention

Aspects of the invention relate generally to optical communication systems, and more particularly to mitigation of polarization mode dispersion (PMD) of multiple optical communication channels.

2. Description of the Prior Art

Optical communication systems typically employ optical fibers for carrying optical communication signals over significant distances. These optical signals typically take the form of a series of light pulses carrying encoded voice information or digital data. As shown in the simplified diagram of FIG. 1, an optical communication system 1 typically includes an optical transmitter 2 and an optical receiver 4 coupled by way of an optical fiber 6. Using such a system 1, the optical transmitter 2 transforms an electrical communication signal 8 into an optical communication signal 10, which is sent to the optical receiver 4 over the optical fiber 6. The optical receiver 4 then converts the optical communication signal 10 back to a received electrical signal 12.

Figure 1:
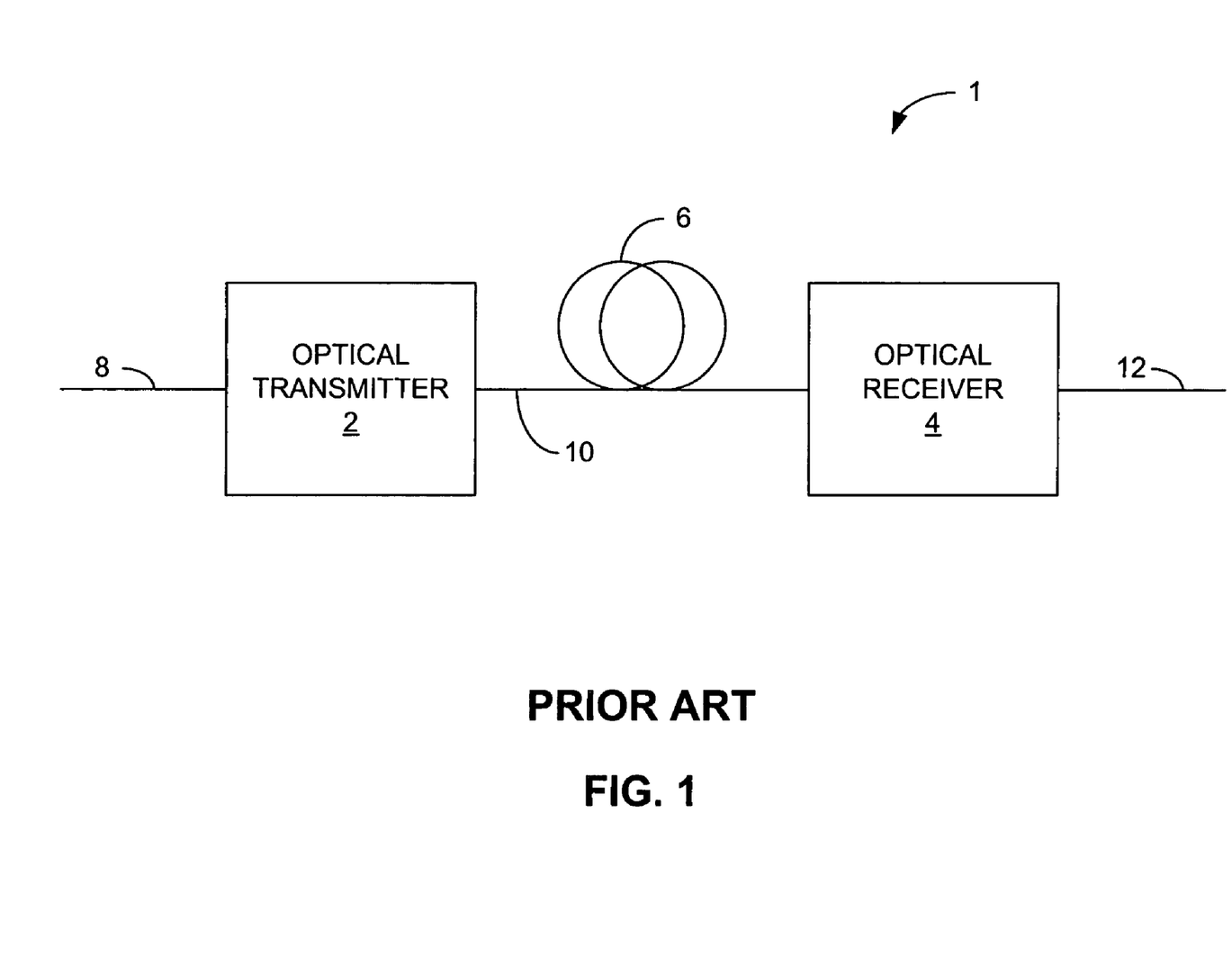
FIG. 1 is a simplified block diagram of an optical communication system from the prior art.

Like other forms of communication, the optical communication signal 10 of the optical communication system 1 is subject to various forms of noise or distortion, thus possibly reducing the fidelity of the optical signal 10 after passing along an optical fiber 6. One particular form of distortion of optical signals 10 is polarization mode dispersion (PMD). Oftentimes, due to manufacturing processes, mechanical stresses, and the like, the cross-sectional shape of the optical fiber 6 may become asymmetric. As a result, such a fiber 6 exhibits asymmetric light propagation characteristics that allow light propagating in a first plane of polarization to propagate more quickly than light propagating in a second plane of polarization perpendicular to the first. These two planes are normally referred to as the principal states of polarization (PSP), and the resulting time delay between the two PSPs is often referred to as differential group delay (DGD). As a result, pulses from the optical transmitter 2 at one end of an optical fiber 6 tend to disperse, or spread in time, by the moment they arrive at the optical receiver 4 at the opposing end of the fiber 6. Thus, each optical pulse may appear as two separate, but closely situated, optical pulses to the receiver 4. Also, adjacent optical pulses may begin to merge. In either case, the "eyes" of an eye pattern produced by the optical pulses tend to shrink or close completely, typically resulting in data corruption or loss at the receiving end.

The deleterious effects of PMD worsen as data rate increases. While PMD has proved to be somewhat problematic at data rates of 10 gigabits-per-second (10 Gbps, or 10 G), PMD has proven to be a major barrier to implementing newer 40 G systems being developed to increase optical communication bandwidth and capacity.

Some methods for mitigating PMD at an optical receiver 4 have been devised. Normally, such methods involve employing a compensator that separates the received optical signal into its two PSPs, typically by way of a polarization beam splitter. The compensator then delays the faster of the two PSPs by the exhibited DGD via a feedback controller to essentially negate the effects of the PMD at the receiver 4.

Figure 2:
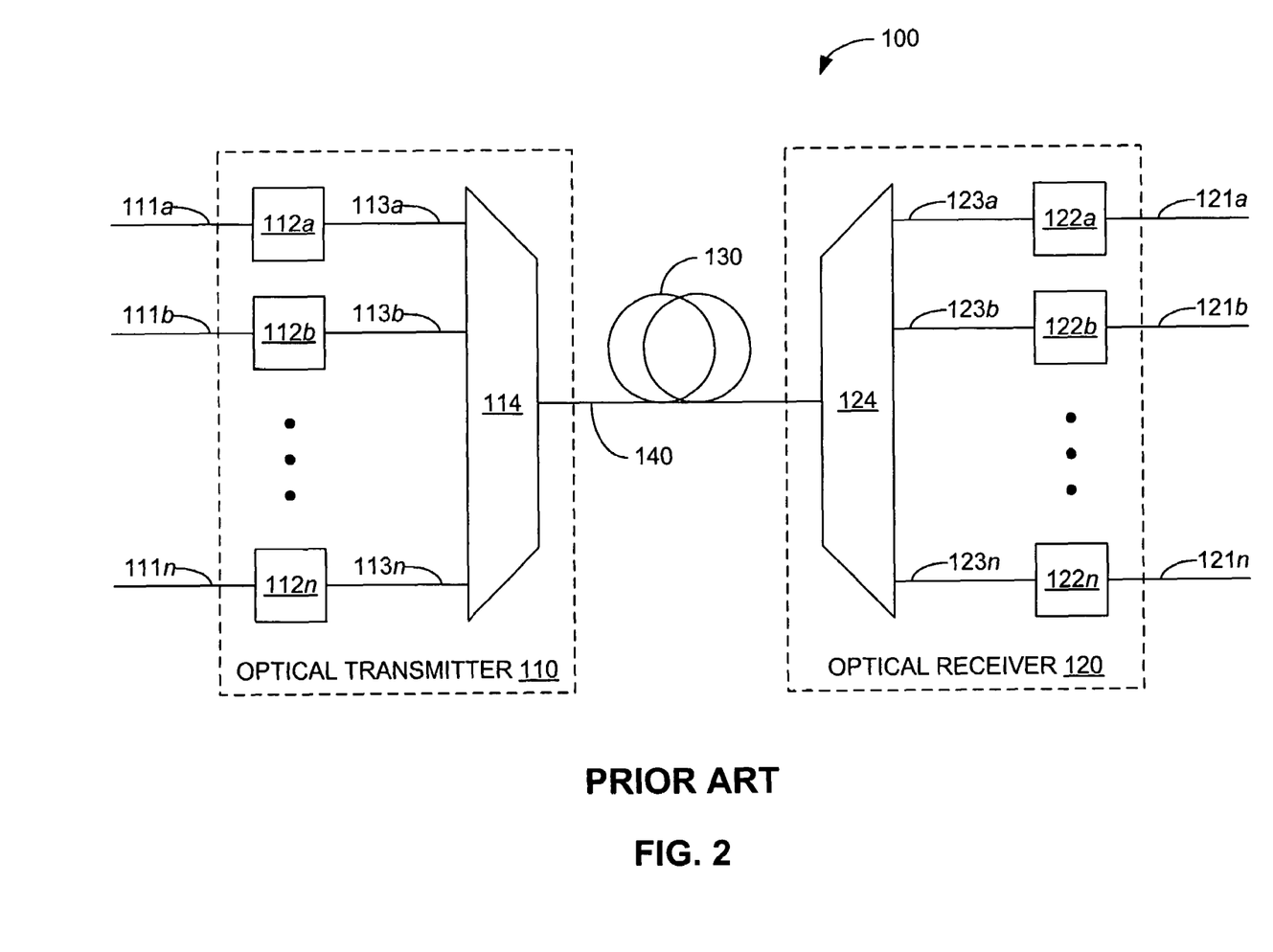
FIG. 2 is a block diagram of a WDM optical communication system from the prior art.

Unfortunately, the efficacy of PMD compensators is restricted in optical communication systems employing wavelength division multiplexing (WDM) or dense wavelength division multiplexing (DWDM). In such systems, multiple communication channels are carried over a single optical fiber by dividing the available bandwidth into several relatively narrow bandwidth or frequency ranges, with each range carrying a single communication channel. FIG. 2 illustrates in a simplified manner a typical WDM optical communication system 100 having a WDM optical transmitter 110, a WDM optical receiver 120, and an optical fiber 130. The optical transmitter 110 includes single-channel optical transmitters 112, each for translating an electrical communication signal 111 into an associated WDM communication channel signal 113 for a particular WDM channel. A WDM multiplexer 114 is used to combine the various WDM channel signals 113 into a combined optical communication signal 140 to be transferred over the fiber 130. Similarly, the optical receiver 120 includes a WDM demultiplexer 124 to separate the various received WDM channel signals 123 comprising the combined optical signal 140, and multiple single-channel receivers 122 for translating each received WDM optical channel signal 123 into a corresponding received electrical signal 121 carrying the communicated information.

As no PMD compensation is provided in the optical communication system 100, PMD exhibited by the fiber 130 is likely to adversely affect the quality of the received WDM optical signals 123 being processed by the optical receiver 120. In addition, the magnitude of the delaying effects of PMD is known to be wavelength-dependent. Thus, simultaneous PMD mitigation of all WDM channel signals 113, as embodied in the combined optical signal 140, by way of a single PMD compensator is normally ineffective. As a result, multiple compensators are typically required for PMD mitigation of the optical signal 140, thereby increasing the cost and complexity of the optical communication system 100.

SUMMARY OF THE INVENTION

One embodiment of the invention, described below, provides an optical transmitter for an optical communication system. The transmitter includes a first optical delay element configured to generate a third optical signal from a first optical signal. Similarly, a second optical delay element is configured to generate a fourth optical signal from a second optical signal. The transmitter also includes an optical multiplexer configured to combine the third and fourth optical signals to produce a fifth optical signal. An optical modulator is employed to alter a pulse width of the fifth optical signal, thus generating a sixth optical signal. In addition, the transmitter employs an optical delay controller configured to control the first optical delay element and the second optical delay element based on the sixth optical signal.

Another embodiment of the invention provides a method of transmission in an optical communication system. At least one of a first optical signal and a second optical signal is delayed in time, resulting in a third optical signal and a fourth optical signal. The third and fourth optical signals are combined to produce a fifth optical signal. A pulse width of the fifth optical signal is altered to produce a sixth optical signal. The delaying of at least one of the first and second optical signals is controlled by way of the sixth optical signal.

Additional embodiments and advantages of the present invention will be realized by those skilled in the art upon perusal of the following detailed description, taken in conjunction with the accompanying drawings.

DETAILED DESCRIPTION OF THE INVENTION

Figure 3:
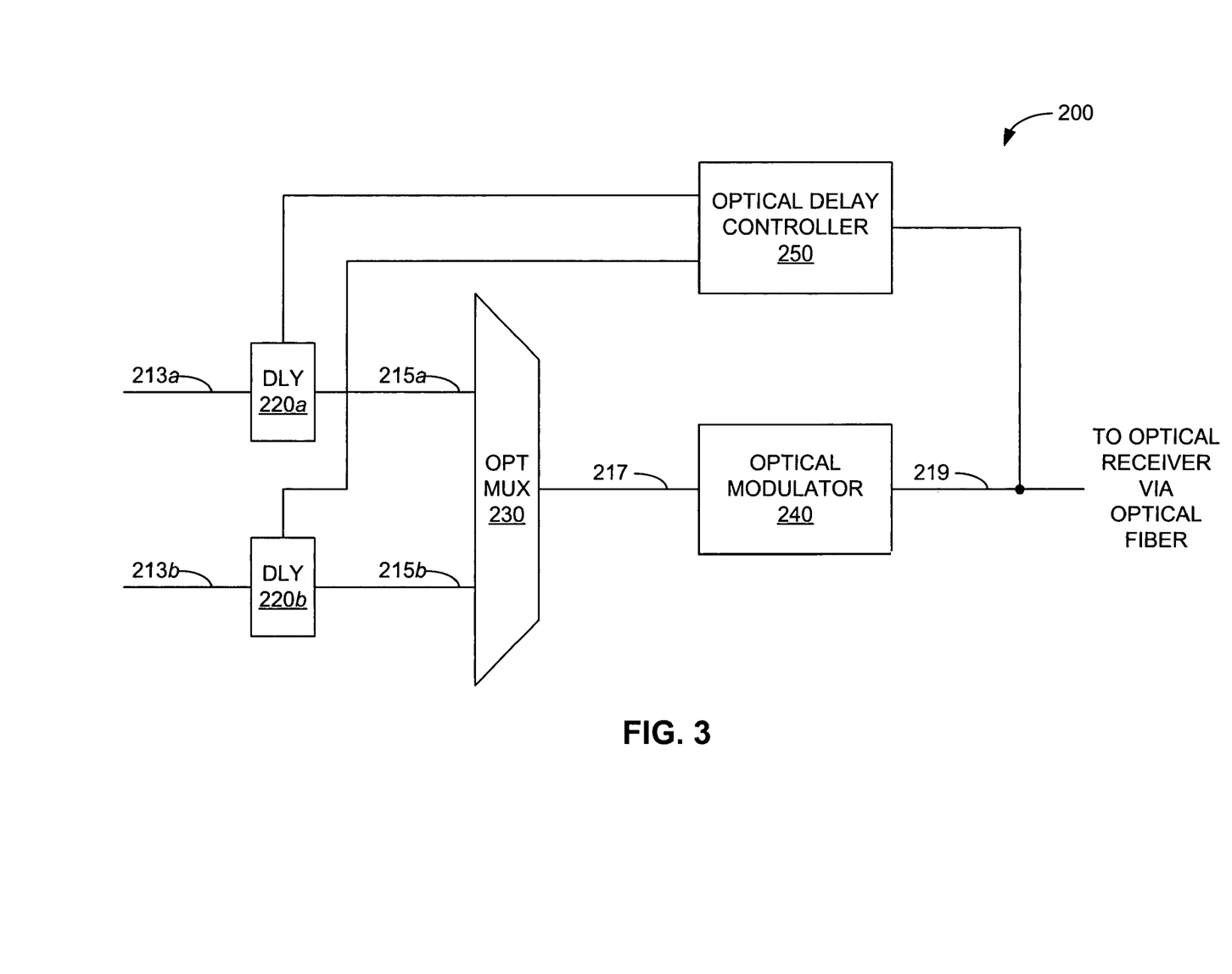
FIG. 3 is a block diagram of a multi-channel optical transmitter according to an embodiment of the invention.

FIG. 3 illustrates an optical transmitter 200 according to one embodiment of the invention. The optical transmitter 200 includes a first optical delay element 220a configured to generate a third optical signal 215a from a first optical signal 213a. Similarly, a second optical delay element 220b is configured to generate a fourth optical signal 215b from a second optical signal 213b. An optical multiplexer 230 is configured to combine the third optical signal 215a and the fourth optical signal 215b to produce a fifth optical signal 217. An optical modulator 240 is configured to alter a pulse width of the fifth optical signal to generate a sixth optical signal 219. An optical delay controller 250 is configured to control the first optical delay element 220a and the second optical delay element 220b based on the sixth optical signal 219.

Figure 4:
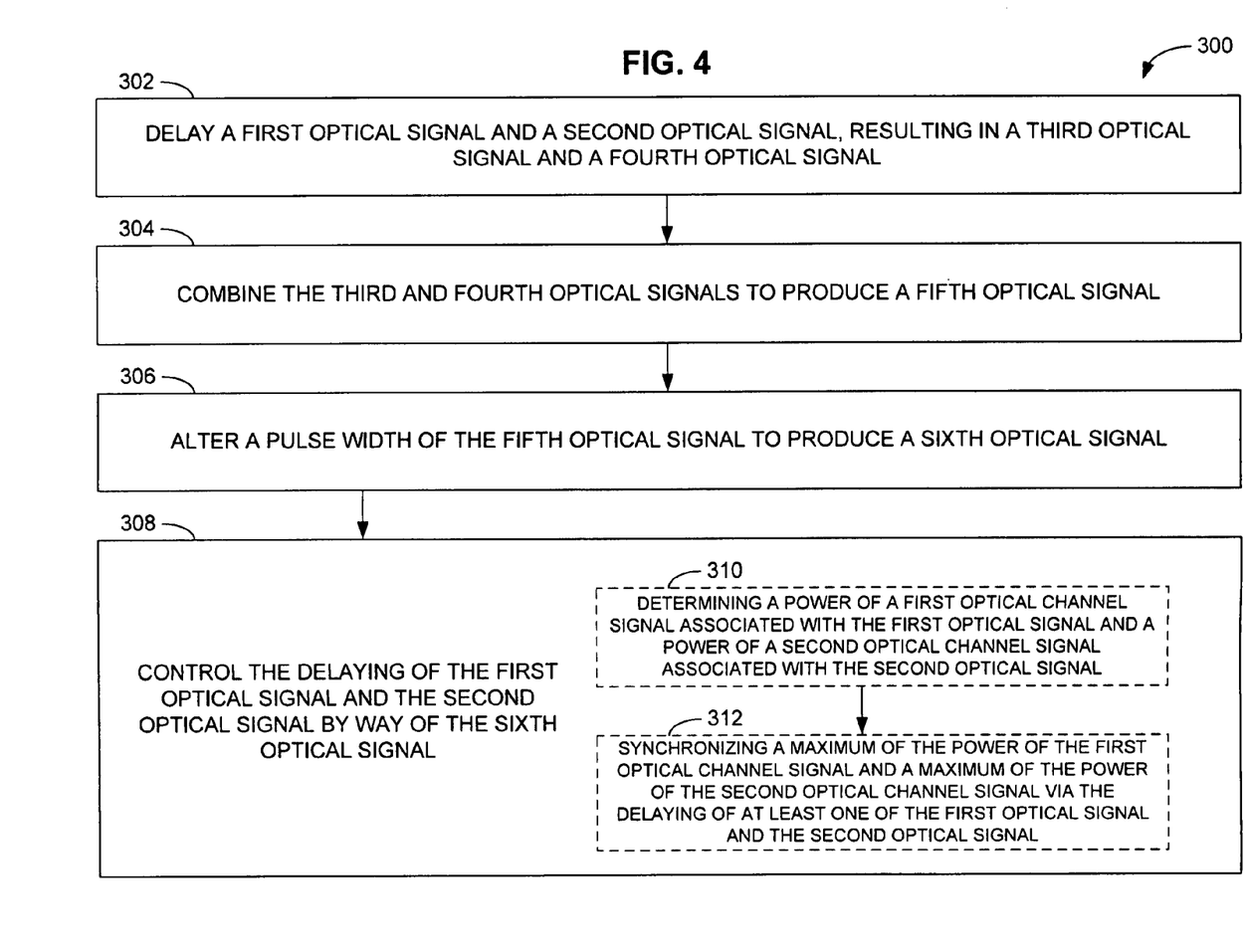
FIG. 4 is a flow diagram of a method of transmission in an optical communication system according to an embodiment of the invention.

FIG. 4 depicts a method 300 of transmission in an optical communication system. At least one of a first optical signal and a second optical signal is delayed, resulting in a third optical signal and a fourth optical signal (operation 302). The third and fourth optical signals are then combined to produce a fifth optical signal (operation 304). A pulse width of the fifth optical signal is altered to produce a sixth optical signal (operation 306). The delaying operation of at least one of the first and second optical signals is controlled by way of the sixth optical signal (operation 308).

Figure 5:
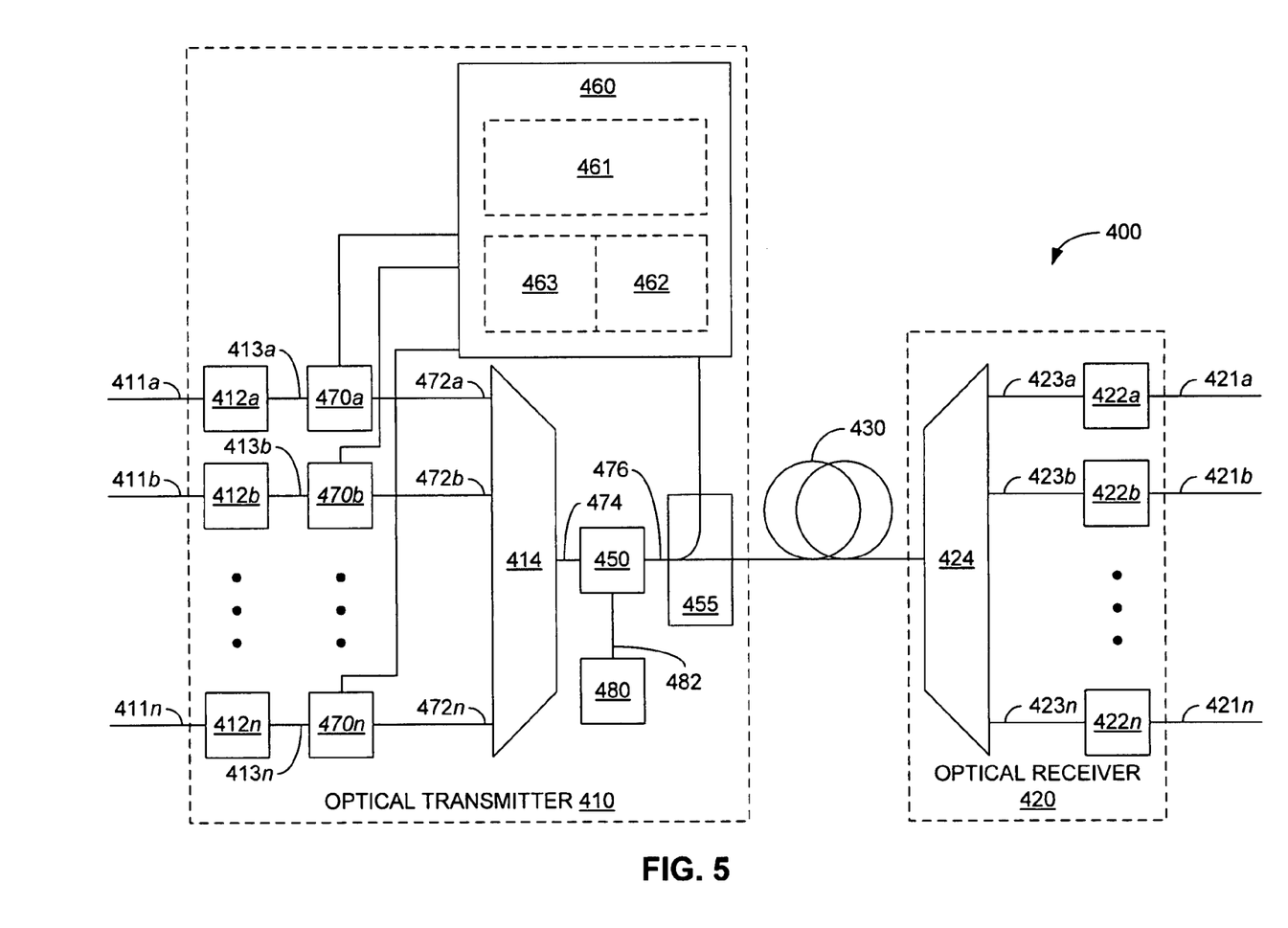
FIG. 5 is block diagram of a WDM optical communication system according to an embodiment of the invention.

In one particular embodiment of the invention, as depicted in FIG. 5, a PMD-mitigated WDM optical communication system 400 includes a PMD-mitigating optical transmitter 410 coupled with an optical receiver 420 by way of an optical fiber 430. The optical transmitter 410 receives an electrical communication signal 411 for each of n WDM channels provided by the communication system 400. Each electrical signal 411 is converted into a corresponding WDM optical channel signal 413 by way of a single-channel optical transmitter 412. Each WDM optical channel signal 413 is potentially delayed by way of a dedicated optical variable delay element 470, resulting in a delayed optical channel signal 472 for each WDM channel. The delayed optical channel signals 472 are then multiplexed into a combined WDM optical signal 474 by way of a WDM multiplexer 414. The combined WDM optical signal 474 is processed by an optical signal modulator 450, which in turn produces a modulated WDM optical signal 476, which is carried to the WDM optical receiver 420 over the optical fiber 430. An optical delay controller 460 employs the modulated WDM optical signal 476 to control each of the optical delay elements 470.

In one embodiment, an optical tap 455 couples the optical modulator 450 with the optical delay controller 460 and the optical fiber 430. The optical tap 455 is employed to divert a portion of the power of the modulated WDM optical signal 476 to the optical delay controller 260, while allowing the majority of the power of the modulated WDM optical signal 476 to propagate down the optical fiber 430 to the optical receiver 420.

Upon receiving the modulated WDM optical signal 476, the optical receiver 420 utilizes a WDM demultiplexer 424, which separates the modulated WDM optical signal 476 into n received WDM optical channel signals 423. Each of the received WDM optical channel signals 423 is then converted to a received electrical signal 421 by way of a single-channel optical receiver 422.

In one embodiment, the various optical signals of the WDM optical communication system 400 employ a series of light pulses to convey information from the optical transmitter 410 to the optical receiver 420. In one particular example, the optical signals employ a return-to-zero (RZ) encoding scheme, whereby the light pulses associated with a particular WDM channel exhibit generally the same pulse width.

Other elements possibly employed by the WDM optical communication system 400 have been omitted for the sake of brevity and clarity. For example, an add/drop multiplexer, which allows the adding or dropping of WDM channels to or from the optical fiber 430, may be employed in other embodiments.

Figure 6:
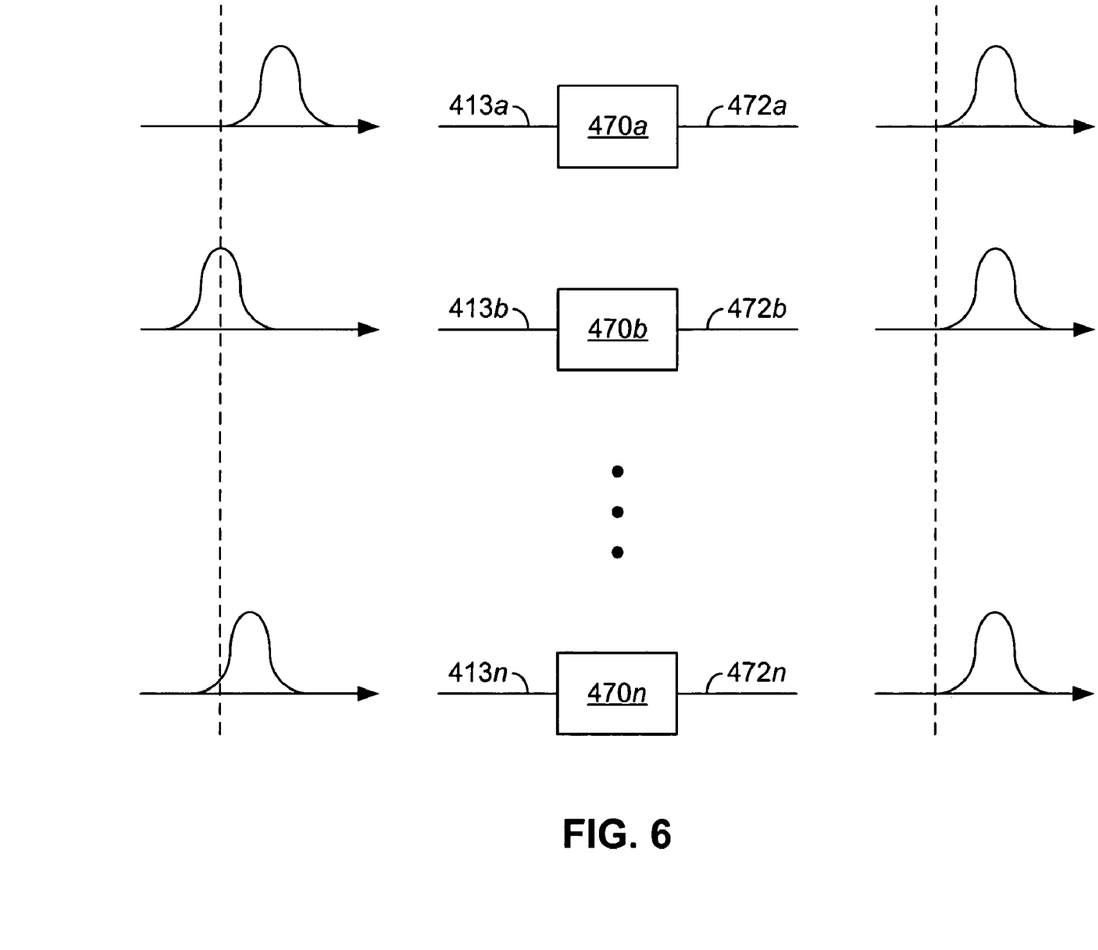
FIG. 6 is graphical display of the operation of optical delay elements employed by the WDM optical communication system of FIG. 5.

In one embodiment, the optical delay controller 460 controls the variable delay of each of the optical delay elements 470 so that pulses of each of the delayed WDM optical channel signals 472 are aligned with each other in time. Thus, the optical delay elements 470, in conjunction with the optical delay controller 460, compensate for any phase differences between the WDM optical channel signals 413, thus synchronizing the delayed WDM optical channel signals 472 with each other. The operation of the optical delay elements 470 is shown graphically in FIG. 6.

In one particular implementation, the optical delay controller 460 employs spectrum analyzer 461 configured to determine the power of each of the individual WDM optical channel signals embodied in the modulated WDM optical signal 476, at various points in time (operation 310). The optical delay controller 460 thus adjusts the delay of each of the delayed WDM optical channel signals 472 so that the maximum power of each of the individual optical channel signals of the modulated WDM optical signal 476 is synchronized (operation 312).

In another embodiment, the optical delay controller 460 uses optical demultiplexer 462 to separate the modulated WDM optical signal 476 into its component WDM optical channel signals. One or more power monitors 463 may then be employed to determine the power of each of the component WDM optical channel signals at various points in time to determine the relative phase differences (operation 310). Using this information, the optical delay controller 460 may then control the optical delay elements 470 so that the component optical channel signals are synchronized (operation 312). Such synchronization often aids in the optical receiver 420 sampling or clocking the optical pulses at or near their peak power, thus potentially reducing any misinterpretation of the data carried via the optical pulses.

Figure 7:
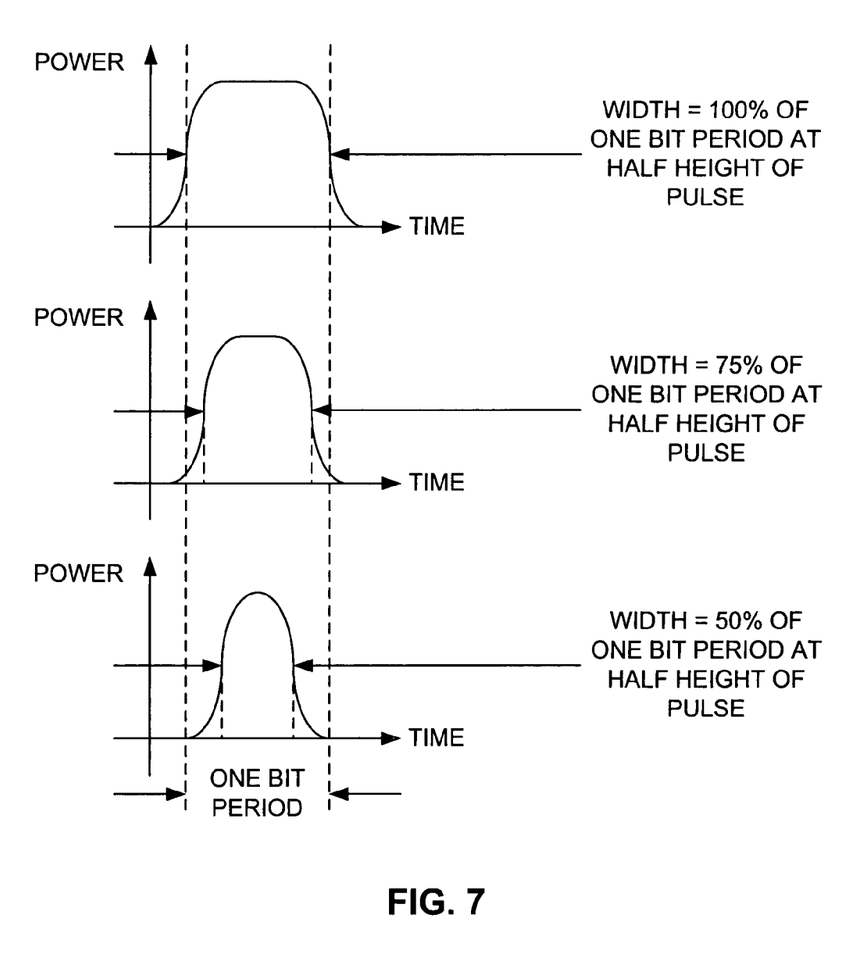
FIG. 7 graphically depicts varying widths of optical pulses in relation to the width of a bit period of an associated optical signal according to an embodiment of the invention.

After the delayed WDM optical channel signals 472 are combined into a combined WDM optical signal 474, the optical signal modulator 450 adjusts the width of the pulses to reduce the effects of PMD, thus producing the modulated optical signal 476. In one embodiment, the optical signal modulator 450 adjusts the pulse widths for each WDM optical channel signal embedded within the modulated WDM optical signal 476 so that the half-height bandwidth (HHBW) of the component optical channel signals is between approximately 45 percent and 55 percent. In other words, the width of each signal pulse at half of the height of the pulse is about 45 percent to 55 percent of a bit period of the optical channel signals. FIG. 7 graphically portrays a comparison between optical signal pulses exhibiting pulse widths of 100 percent, 75 percent, and 50 percent of HHBW.

Referring again to the optical delay controller 460 of FIG. 5, the width of the optical pulses of the modulated WDM optical signal 476 produced by the optical modulator 450 may be checked or verified by the optical delay controller 460. Thus, the controller 460 may inform the modulator 450 of any necessary corrections to yield the desired pulse width.

Reduction of the width of the optical pulses transmitted over the optical fiber 430 typically mitigates the effects of PMD by providing an optimum optical pulse width which allows proper interpretation of the modulated WDM optical signal 476 in spite of PMD effects induced by the fiber 430. For example, relatively wide optical pulse widths tend to result in adjacent optical pulses merging at an optical receiver 420. Conversely, relatively narrow pulse widths tend to result in a single pulse being split into two separate pulses being detected at the optical receiver 420. However, employing a pulse width at half-height on the order of 45 percent to 55 percent of a bit period tends to reduce the occurrence of either phenomenon. Thus, the need for PDM mitigation at the optical receiver 420 of the optical communication system 400 is greatly reduced or eliminated.

In one embodiment, the modulator 450 employs a clock signal 482 provided by a clock generator 480, as shown in FIG. 5. The clock signal 482 exhibits the same frequency as the communication signals provided in the combined WDM optical signal 476, and is employed by the modulator 450 to adjust the pulse widths of the incoming combined optical signal 474 to generate the modulated optical signal 476.

One advantage of the particular optical transmitter 410 displayed in FIG. 5 is that only a single modulator 450 is required to implement the narrow optical pulses for each of the component optical signals embedded in the modulated WDM optical signal 476. Modification of the pulse widths of each embedded channel signals is desirable, as PMD induced by the optical fiber 430 affects each channel differently, since the magnitude of the resulting DGD is wavelength-dependent, as mentioned above. While multiple optical delay elements 470 are implemented in the transmitter 410, each delay element 470 is typically much less expensive when compared to the cost of the modulator 450. Thus, the optical transmitter 410 of FIG. 5 employs a cost-effective PMD mitigation system.

While several embodiments of the invention have been discussed herein, other embodiments encompassed within the scope of the invention are possible. For example, while the specific embodiments discussed herein specifically involve WDM signals, other optical communication systems, such as those employing DWDM signals, may also benefit from various aspects of the present invention as set forth above. Also, aspects of one embodiment may be combined with aspects of other embodiments disclosed above to produce additional embodiments not heretofore discussed. Thus, while the present invention has been described in the context of specific embodiments, such descriptions are provided for illustration and not limitation. Accordingly, the proper scope of the present invention is delimited only by the following claims.

What is claimed is:

1. An optical transmitter for an optical communication system, comprising:
    a first optical delay element configured to generate a third optical signal from a first optical signal;
    a second optical delay element configured to generate a fourth optical signal from a second optical signal;
    an optical multiplexer configured to combine the third and fourth optical signals to produce a fifth optical signal;
    an optical modulator configured to alter a pulse width of the fifth optical signal to generate a sixth optical signal; and
    an optical delay controller configured to control the first optical delay element and the second optical delay element to synchronize the third and fourth optical signals with each other based on the sixth optical signal, wherein the synchronization aligns pulses of the third and fourth optical signals with each other in time;
    wherein the optical delay controller comprises a spectrum analyzer configured to determine a power over time of a first optical channel signal associated with the first optical signal and a power over time of a second optical channel signal associated with the second optical signal, wherein the sixth optical signal comprises the first optical channel signal and the second optical channel signal; and
    wherein the optical delay controller adjusts the first optical delay element and the second optical delay element such that a maximum of the power of the first optical channel signal and a maximum of the power of the second optical channel signal are synchronized.

2. The optical transmitter of claim 1, further comprising:
    a first single-channel optical transmitter configured to convert a first electrical signal into the first optical signal;
    a second single-channel optical transmitter configured to convert a second electrical signal into the second optical signal.

3. The optical transmitter of claim 1, wherein the sixth optical signal is a wavelength-division-multiplexed optical signal.

4. The optical transmitter of claim 1, wherein the sixth optical signal is a dense wavelength-division-multiplexed optical signal.

5. The optical transmitter of claim 1, further comprising an optical tap coupling the optical modulator with the optical delay controller and an optical fiber.

6. The optical transmitter of claim 1, further comprising a clock generator configured to provide a clock signal employed by the optical modulator to alter the pulse width of the fifth optical signal.

7. The optical transmitter of claim 1, wherein the sixth optical signal employs return-to-zero encoding.

8. The optical transmitter of claim 1, wherein the optical delay controller further comprises:
    an optical demultiplexer configured to separate a first optical channel signal associated with the first optical signal and a second optical channel signal associated with the second optical signal from the sixth optical signal;

a power monitor configured to determine a power of the first optical channel signal and a power of the second optical channel signal;

wherein the optical delay controller adjusts the first optical delay element and the second optical delay element such that a maximum of the power of the first optical channel signal and a maximum of the power of the second optical channel signal are synchronized.

9. The optical transmitter of claim 1, wherein the optical delay controller is further configured to verify a pulse width of the sixth optical signal.

10. The optical transmitter of claim 1, wherein a width of an optical pulse of the sixth optical signal at half of a height of the optical pulse is between approximately 45 percent and 55 percent of a bit period of the sixth optical signal.

11. A method of transmission in an optical communication system, comprising:

delaying at least one of a first optical signal and a second optical signal, resulting in a third optical signal and a fourth optical signal;

combining the third and fourth optical signals to produce a fifth optical signal;

altering a pulse width of the fifth optical signal to produce a sixth optical signal; and controlling the delaying of at least one of the first and second optical signals by way of the sixth optical signal resulting in a synchronization of the third and fourth optical signals with each other, wherein the synchronization aligns pulses of the third and fourth optical signals with each other in time;

wherein controlling the delaying of at least one of the first and second optical signals by way of the sixth optical signal comprises:

in a spectrum analyzer, determining a power over time of a first optical channel signal associated with the first optical signal and a power over time of a second optical channel signal associated with the second optical signal;

wherein the sixth optical signal comprises the first optical channel signal and the second optical channel signal;

and synchronizing a maximum of the power of the first optical channel signal and a maximum of the second optical channel signal via the delaying of at least one of the first optical signal and the second optical signal.

12. The method of claim 11, further comprising:

converting a first electrical signal into the first optical signal; and converting a second electrical signal into the second optical signal.

13. The method of claim 11, wherein the sixth optical signal is a wavelength-division-multiplexed optical signal.

14. The method of claim 11, wherein the sixth optical signal is a dense wavelength-division-multiplexed optical signal.

15. The method of claim 11, wherein the sixth optical signal employs return-to-zero encoding.

16. The method of claim 11, further comprising verifying a pulse width of the sixth optical signal.

17. The method of claim 11, wherein a width of an optical pulse of the sixth optical signal at half of a height of the optical pulse is between approximately 45 percent and 55 percent of a bit period of the sixth optical signal.

* * * * *

UNITED STATES PATENT AND TRADEMARK OFFICE
CERTIFICATE OF CORRECTION

| | |
|---|---|
| PATENT NO. | : 7,623,798 B1 |
| APPLICATION NO. | : 11/243107 |
| DATED | : November 24, 2009 |
| INVENTOR(S) | : Youichi Akasaka |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 860 days.

Signed and Sealed this

Twenty-sixth Day of October, 2010

David J. Kappos
*Director of the United States Patent and Trademark Office*